United States Patent [19] [11] Patent Number: 5,332,560
Kruesi et al. [45] Date of Patent: Jul. 26, 1994

[54] PROCESS FOR THE REMOVAL OF ZINC AND NICKEL FROM COPPER AMMINE SULFATE SOLUTIONS

[75] Inventors: William H. Kruesi; Paul R. Kruesi, both of Golden, Colo.

[73] Assignee: Cato Research Corporation, Wheat Ridge, Colo.

[21] Appl. No.: 27,554

[22] Filed: Mar. 5, 1993

Related U.S. Application Data

[63] Continuation of Ser. No. 530,834, May 30, 1990, abandoned.

[51] Int. Cl.$^5$ .............. C01G 3/14; C22B 15/00; C22B 19/00; C22B 23/00
[52] U.S. Cl. .......................... 423/32; 423/34; 423/36; 423/41; 423/45; 423/99; 423/101; 423/106; 423/140; 423/143; 423/145; 423/146
[58] Field of Search ............ 423/23, 24, 27, 32, 423/34, 40, 99, 100, 101, 106, 138, 139, 140, 143, 145, 146, 36, 41, 45; 204/106

[56] References Cited

U.S. PATENT DOCUMENTS

| | | | |
|---|---|---|---|
| 2,647,819 | 8/1953 | McGauley | 423/145 |
| 2,805,918 | 9/1957 | Van Hare, Jr. et al. | 12/61 |
| 3,523,787 | 8/1970 | Ullrich et al. | 75/103 |
| 3,703,451 | 11/1972 | Healy | 204/106 |
| 3,833,717 | 9/1974 | Haskett et al. | 423/604 |
| 3,853,981 | 12/1974 | Hadzeriga | 423/24 |
| 3,929,598 | 12/1975 | Stern et al. | 204/108 |
| 3,967,957 | 7/1976 | Fonseca | 75/103 |
| 4,028,202 | 6/1977 | Ammann et al. | 204/106 |
| 4,043,882 | 8/1977 | Skarbo et al. | 204/106 |
| 4,314,976 | 2/1982 | Stewart et al. | 423/139 |

FOREIGN PATENT DOCUMENTS 1062474 9/1979 Canada.

OTHER PUBLICATIONS

Strancyzyk & Rampacek, "Recovery of Zinc from Ammoniacal-Ammonium Sulfate Leach Solutions," Bureau of Mines no date.
Mellor, *A Comprehensive Treatise on Inorganic and Theoretical Chemistry*, pp. 251-261, 633-635 (vol. 4, 1960), 466-469 (vol. 15, 1936).
*Encyclopedia of Chemical Technology*, Chapters on "Electrochemical Processing" and Electroplating, vol. 8, 1979.
Nilsen, Siemens & Rhoads, *Solven Extraction of Cobalt from Laterite-Ammoniacal Leach Liquors* (Burea of Mines RI 8419) no date.

*Primary Examiner*—Michael Lewis
*Assistant Examiner*—Steven Bos
*Attorney, Agent, or Firm*—Sheridan Ross & McIntosh

[57] ABSTRACT

A method for the recovery of copper from copper-containing materials, for example, scrap, ores or dust. An aqueous cupric tetrammine sulfate lixiviant is contacted with the copper-containing material to produce a leachate containing cuprous, nickel, and zinc ions, ammonium sulfate and free ammonia. Copper can be recovered from the leachate by electrolysis. Nickel and zinc can be precipitated from the resulting spent electrolyte by oxidizing substantially all of the cuprous ions in the copper ammine sulfate solution to cupric ions and lowering the pH of the solution to a range from about pH 7.5 to about pH 8.0 in order to form a precipitate. Alternatively, copper sulfate can be added to the cupric ammine sulfate-containing solution in order to form nickel and/or zinc containing precipitate.

12 Claims, 2 Drawing Sheets

PROCESS FOR THE REMOVAL OF ZINC AND NICKEL FROM COPPER AMMINE SULFATE SOLUTIONS This is a continuation of copending application Ser. No. 07/530,834, filed on May 30, 1990, now abandoned.

RELATED APPLICATION

This application is related to U.S. patent application Ser. No. 07/530,824, filed on May 30, 1990, now U.S. Pat. No. 5,173,276 and entitled "Method for Recovery of Copper from Copper-Containing Materials", the specification of which is incorporated by reference herein in its entirety.

FIELD OF THE INVENTION

This invention involves the removal of zinc and nickel from a copper ammine sulfate solution by the precipitation of the ammonium sulfate salts of zinc and nickel.

BACKGROUND OF THE INVENTION

The recycling of copper from copper-containing scrap accounts for a significant part of the United States copper supply. While scrap with a copper concentration greater than 50% may be economically smelted, lower grades of copper scrap, particularly those with a copper concentration of less than 30% by weight, are infrequently recycled because existing methods are not economical. Low grade copper scrap is generated at a rate of 200,000–300,000 tons per year. An example of low grade scrap is the "breakage" portion of shredded automobile scrap produced by the sorting of copper-containing motors. The breakage typically contains 10–20% copper by weight.

Recycled copper can be used in the production of valuable copper compounds. Copper compounds such as tribasic copper sulfate and copper sulfate have wide application. Copper sulfate is a fungicide and algicide and is used as a source of copper in animal nutrition, as a fertilizer, and as a source for other copper compounds. Tribasic copper sulfate is a fungicide and is a source for other copper compounds.

In view of the large quantity of low grade copper scrap and the commercial value of copper compounds, an economical method for the production of copper from low grade copper materials is needed. Preferably the method would produce the copper in a concentrated form with minimal contamination by other metals.

Cupric tetrammine sulfate has long been regarded as a desirable lixiviant for the selective extraction of copper from copper-containing ores, dust and scrap. The resulting copper ammine sulfate leachate can then be used as a electrolyte in the production of cathode copper. However, contaminants can be present in the leachate/electrolyte in quantities sufficient to contaminate the copper plate at the cathode. Common contaminants found in leachate produced from the leaching of ores, dust and scrap include zinc and nickel. During the process of leaching copper-containing ores, dusts or scrap, the cupric ion of the lixiviant undergoes an oxidation/reduction reaction with the copper metal in the scrap, ore or dust to form the soluble cuprous ion. However, the cupric ion also undergoes oxidation/reduction with nickel and zinc in the scrap, ores or dust to form soluble nickel and zinc ammine sulfates. The resulting leachate contains solubilized copper ammine sulfate, zinc ammine sulfate and nickel ammine sulfate. To maintain a 99.99% by weight purity of copper plate, the nickel concentration should remain below about 10 grams per liter (g/l) and the zinc concentration should remain below about 25 g/l in the leachate/electrolyte. Accordingly, there is a need for a method to reduce nickel and zinc contamination in copper ammine sulfate leachates to allow the cathode recovery of high purity copper. Preferably, this method would remove the nickel and zinc in a form that would allow nickel and zinc recovery as well.

Methods have been devised for the recovery of zinc and copper from ammoniacal ammonium sulfate leachates. In Stern et al., U.S. Pat. No. 3,929,598 (1975), a method is disclosed for the removal of copper from an ammoniacal ammonium sulfate leachate by treatment with a liquid ion exchanger. Liquid ion exchange treatment comprises an organic, water-immiscible solution of a reagent which selectively loads copper in countercurrent relation with the copper and zinc ammonium sulfate leachate. The loaded organic phase is then stripped with an aqueous solution of sulfuric acid to produce a copper sulfate solution substantially free of nickel, zinc and cobalt contamination, that can be recovered by electrowinning. The aqueous ammonium sulfate raffinate contains zinc and may contain nickel, cobalt, silver and minor amounts of copper. Depending on the level of nickel, cobalt, silver and copper contamination of the zinc ammonium sulfate raffinate, the raffinate may be used directly as an electrolyte for the recovery of zinc, or may undergo a variety of purification methods prior to the electrowinning of zinc. A disadvantage of the Stern et al. method is that it does not provide for the recovery of nickel from the nickel, zinc and copper ammine sulfate leachate.

Ullrich et al., U.S. Pat. No. 3,523,787 (1970), discloses a method for the recovery of copper and zinc from an ammoniated ammine sulfate leachate by the precipitation of a copper-zinc ammonium sulfate salt. To form the precipitate, the pH of an ammoniated copper and zinc ammonium sulfate leachate is reduced to between pH 1.6 and pH 3.0. The precipitate is then separated from the leachate and heated to 400° to 500° C. to volatilize water and ammonia. The resulting solid is a mixture of anhydrous copper and zinc sulfates and oxides, which are then taken up in a dilute sulfuric acid slurry to separate contaminating lead and calcium in the form of insoluble $PbSO_4$ and $CaSO_4$. Following removal of the $PbSO_4$ and $CaSO_4$ precipitate, the high purity copper-zinc sulfate brine is treated with potassium chloride to form $CuCl_2$ and $ZnCl_2$. Cupric chloride ($CuCl_2$) is then reduced by bubbling through $SO_2$ gas to form insoluble cuprous chloride (CuCl). The removed CuCl can then be reduced to produce metallic copper of high purity. Following removal of the CuCl precipitate, the $ZnCl_2$ brine, which may contain some residual copper, is purified by zinc cementation to remove the copper. The purified $ZnCl_2$ brine is then treated with $NaCO_3$ to cause the precipitation of $ZnCO_3$. The Ullrich et al. method has the disadvantage that it does not provide for the recovery of nickel.

Accordingly, it would be advantageous to have a method for decreasing the nickel and zinc concentrations in a copper ammine sulfate solution. The method preferably should provide for the removal of zinc and nickel in a form that allows for zinc and nickel recovery. It has been found that the present invention meets these needs.

SUMMARY OF THE INVENTION

Figure 1A:
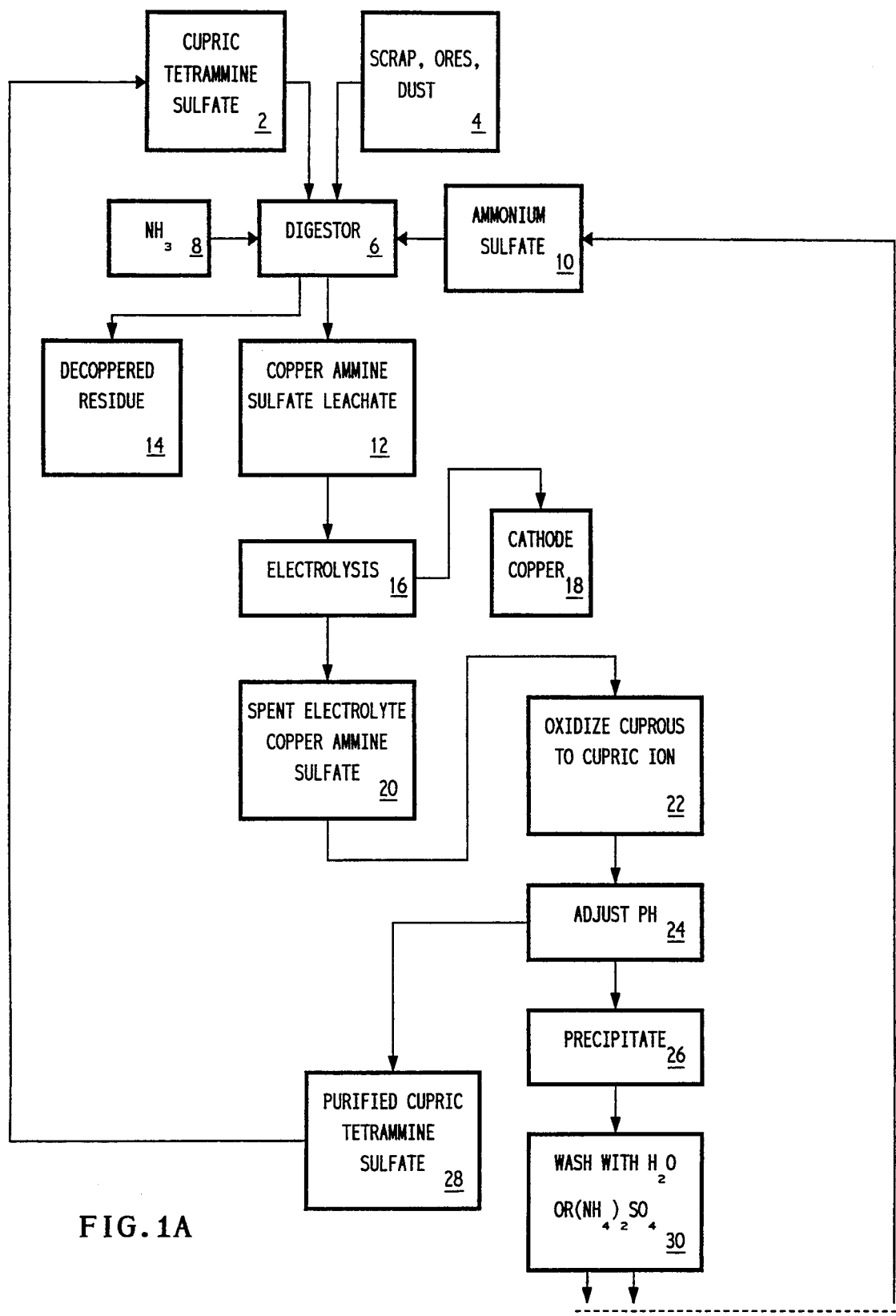
FIG. 1A and FIG. 1B are schematic flow charts illustrating one embodiment of the method of the present invention.

The present method involves a method for the separation of zinc and nickel from an aqueous copper ammine sulfate solution by precipitating nickel- and/or zinc-containing compounds from the solution. One embodiment of the method involves the oxidizing of substantially all of the cuprous ions in the copper ammine sulfate solution to cupric ions and adjusting the pH of the solution to a range from about pH 7.5 to about pH 8.0. In another embodiment, the method involves replacing the step of adjusting the pH of the solution to between about pH 7.5 and about pH 8.0 with the step of adding an amount of copper sulfate to the cupric ammine sulfate solution sufficient to form the nickel- and/or zinc-containing precipitate.

In another embodiment, the present invention involves the recovery of copper from copper-containing material, for example, scrap, ores or dusts. An aqueous cupric tetrammine sulfate lixiviant is contacted with the copper-containing material to produce a leachate containing cuprous, nickel and zinc ions, ammonium sulfate and free ammonia. Copper can be recovered from the leachate by electrolysis. To maintain copper plate purity above about 99.99% by weight, nickel and zinc contamination in the leachate should be maintained below about 10 g/l and 25 g/l, respectively.

DETAILED DESCRIPTION OF THE INVENTION

The present invention involves a method for the separation of nickel and zinc from a copper, zinc and nickel ammine sulfate solution by the selective precipitation of ammonium sulfate salts of nickel and zinc from the solution. The precipitate contains nickel and zinc, typically as $NiSO_4 \cdot (NH_4)SO_4 \cdot 6H_2O$, $ZnSO_4 \cdot (NH_4)SO_4 \cdot 6H_2O$ and $NiSO_4 \cdot ZnSO_4 \cdot (NH_4)_2SO_4 \cdot XH_2O$ (with X=0 to 6). Nickel and zinc can readily be recovered from these compounds.

A preferred embodiment of the method of the present invention involves the following steps: contacting copper-containing ores, dusts or scrap with an aqueous cupric tetrammine sulfate lixiviant to produce a cuprous ammine sulfate leachate which contains soluble nickel, preferably at less than about 10 g/l, and zinc, preferably at less than about 25 g/l; subjecting the leachate to electrolysis for the recovery of cathode copper; contacting the spent electrolyte with an oxidizing agent to oxidize substantially all of the cuprous ions to the cupric state; lowering the pH from above about pH 8.5 to the range from about pH 7.5 to about pH 8.0 to cause the precipitation of ammonium sulfate salts of zinc and nickel; separating the precipitate from the cupric tetrammine sulfate solution; and washing the precipitate with water or ammonium sulfate to remove adhering copper ions. The resulting cupric tetrammine sulfate solution preferably has less than about 2.0 g/l total nickel and zinc contamination and can be recycled as a lixiviant to leach copper from copper-containing materials. The precipitates, ammonium sulfate salts of nickel and zinc, have as little as 0.1% by weight copper contamination. Nickel and zinc can be readily recovered from the precipitate.

To extract copper from ores, scrap or dust, the copper-containing material is contacted with a cupric tetrammine sulfate lixiviant to solubilize the metallic copper therein. The cupric ion of cupric tetrammine sulfate oxidizes the metallic copper present in the copper-containing material to form a copper ammine sulfate leachate containing copper primarily in the cuprous state. However, as discussed hereinabove, cupric tetrammine sulfate also oxidizes metallic nickel and zinc in the copper-containing material to produce soluble nickel ammine sulfate and zinc ammine sulfate complexes.

Contacting the copper-containing material with the cupric tetrammine sulfate lixiviant can be accomplished in a digesting or leaching zone. Agitation or mixing can be provided to maximize leaching efficiency. The mixing can be accomplished in the leaching zone in any manner suitable for mixing such materials, for example, by recycling the leachate through the leaching zone, rotating the leaching zone vessel, or stirring the leaching zone with a mechanical mixer such as an impeller.

The lixiviant solution contains ammonium sulfate in a concentration of at least 100 g/l, and preferably 250–300 g/l. It has been found that copper solubility in cupric tetrammine sulfate solution increases with increasing ammonium sulfate concentration in the lixiviant. It has also been found that the recovery of zinc and nickel in the precipitate is enhanced with increasing ammonium sulfate concentrations in the lixiviant.

The lixiviant should have a free ammonia concentration sufficient to produce a pH of at least about pH 8.5, preferably a pH greater than about pH 9.0, and more preferably greater than about pH 9.5. A pH greater than about pH 9.5 is preferred because the iron present in scrap can be solubilized below about pH 9.5 by the lixiviant. Typically, obtaining a pH greater than about pH 8.5 requires a concentration of free ammonia greater than about 40 g/l. "Free ammonia" as used herein means ammonia not complexed to copper, zinc, nickel or other ammine forming metals. Ammonia can be added to adjust the pH and free ammonia concentration by bubbling ammonia gas through the solution or by adding a solution of aqueous ammonia.

The cupric ion concentration of the cupric tetrammine sulfate lixiviant can be between about 10 and about 90 g/l. While the cupric ion concentration in the lixiviant must be sufficient to oxidize the metallic copper in the copper-containing material, it is preferred that the concentration remain well below the saturation level for cupric ion (i.e., 90–100 g/l) to allow for the solubilization of substantial quantities of the metallic copper present in the copper-containing material.

The leaching process results in an aqueous solution of copper (mainly cuprous) ammine sulfate, nickel ammine sulfate and zinc ammine sulfate. As discussed hereinabove, the nickel and zinc concentrations preferably are less than about 10 g/l and about 25 g/l, respectively, in order to obtain 99.99% pure copper by electrowinning. The decoppered residue is removed from the leachate by any suitable separation means, for example, filtration or centrifugation.

The leachate solution can be subjected to electrowinning in order to recover copper. If the zinc and nickel concentrations in the solution entering the electrolysis cell are maintained below about 25 g/l and about 10 g/l, respectively, the copper plate can have a purity of greater than 99.99% by weight. In copper electrowinning, only a portion of the copper is typically recovered at the cathode. Preferably an amount of copper equivalent to a loss of about 20 g/l to about 30 g/l in the electrolyte is removed at the cathode.

The spent electrolyte, which contains cuprous and cupric ammine sulfate, is then treated to selectively precipitate the ammonium sulfate salts of nickel and zinc. It has been determined that difficulties previously encountered in the removal of zinc and nickel impurities from copper ammine sulfate solutions resulted from the relative instability of cuprous ammine sulfate which causes copper compounds, including cuprous hydroxide, to co-precipitate with the ammonium sulfate salts of nickel and zinc. In contrast, cupric tetrammine sulfate is more stable in solution than cuprous ammine sulfate and the cupric ion remains in solution at the pH and concentration of ammonium sulfate at which the ammonium sulfate salts of zinc and nickel precipitate. Consequently, zinc and nickel can be effectively removed, leaving a cupric tetrammine sulfate solution relatively free of nickel and zinc contaminants.

The selective precipitation of the ammonium sulfate salts of nickel and zinc from the cuprous ammine sulfate solution is accomplished first by the oxidation of the cuprous ion to cupric ion, and then by the lowering of the pH of the solution to between about pH 7.5 and about pH 8.0.

The oxidation can be accomplished by mixing oxygen with the solution or by vigorously stirring air into the solution. Additionally, or alternatively, air, enriched air or substantially pure oxygen can be bubbled through the solution. To minimize the loss of copper from solution during the precipitation step, the successful practice of the present invention requires that at least about 95%, and preferably at least about 99% of the cuprous ion in solution be converted to the cupric ion prior to precipitation of the zinc and nickel ammonium sulfate salts. It has been found that if the cupric ion concentration is less than 95% of the total copper in solution, the copper contamination in the ammonium sulfate salts of nickel and zinc increases to undesirable levels.

Following the leaching, electrolysis and oxidation steps, the pH of the resulting cupric tetrammine sulfate solution is typically above about pH 8.5. The pH can then be slowly lowered to a range from about pH 7.5 to about pH 8.0. The pH adjustment limitation is important in the practice of the present invention for the effective separation of copper from zinc and nickel. It has been found that the pH should not be lowered to below about pH 7.5 because copper compounds, including copper oxysulfate, can co-precipitate and contaminate the ammonium sulfate salts of nickel and zinc.

The pH can be lowered by a number of methods known in the art. For example, the pH may be lowered by the volatilization of ammonia by the heating of the copper tetrammine sulfate-containing solution. To accelerate the volatilization, the heating of the solution can be carried out in a vacuum.

A second method for the lowering of the pH is by the addition of $H_2SO_4$, causing the formation of additional ammonium sulfate and the lowering of the pH. As will be recognized by one skilled in the art, any acid can be used to lower the pH of the solution to effect precipitation of nickel and zinc compounds. However, sulfuric acid is preferred because it does not add impurities to the system. Further, the cupric tetrammine sulfate, following recovery of zinc and nickel therefrom, can be recycled to the leaching zone. Therefore, the acid used to lower the pH for precipitation of the ammonium sulfate salts of zinc and nickel should not be one that destroys the selectivity of the cupric tetrammine sulfate lixiviant for copper. For example, if carbonic acid were used to reduce the pH of the cupric tetrammine sulfate solution, the solution recycled to the leaching zone would contain carbonate ions that would solubilize metals not otherwise soluble in a cupric tetrammine sulfate lixiviant, thereby resulting in a loss of copper selectivity.

Sulfuric acid of a 1:1 dilution, or about 60% by weight $H_2SO_4$, is preferred for pH control. A more concentrated acid reacts violently when added to the cupric tetrammine sulfate-containing solution. A weaker acid dilutes the solution which is recirculated to treat more copper-containing materials.

Another method of precipitating the ammonium sulfate salts of nickel and zinc is to add $CuSO_4$ as a solid or concentrated aqueous solution to the leachate. Because the cupric tetrammine complex is more stable than either the nickel ammine or zinc ammine complexes, the copper displaces the nickel and zinc. The addition of $CuSO_4$ has the same effect as lowering the pH.

The various means of lowering the pH and/or precipitating the ammonium sulfate salts of zinc and nickel can result in the heating of the leachate. The ammonia evaporation is typically carried out with heat, and the copper sulfate addition is exothermic as is the reaction between sulfuric acid and the ammine. Because the solubility of the ammonium sulfate salts of nickel and zinc increases with increasing temperatures, the cupric tetrammine sulfate solution should be cooled during and/or after the pH adjustment. It is preferred that the temperature of the solution be maintained between 20° C. and 30° C., and it is more preferred that the temperature be about 25° C.

It has been found that the presence of at least about 5 g/l of zinc in the oxidized, spent electrolyte enhances the recovery of nickel in the precipitate. It is preferred that the zinc concentration be between about 15 g/l and about 20 g/l. Because the copper ammine sulfate electrolyte preferably has a zinc concentration below about 25 g/l to assure cathode copper purity of about 99.99% by weight, the spent electrolyte and the cupric tetrammine sulfate-containing solution preferably also has a zinc concentration below about 25 g/l.

As discussed hereinabove, the precipitate comprises a mixture of compounds, including hydrated forms of $NiSO_4.(NH_4)_2SO_4$, $ZnSO_4.(NH_4)_2SO_4$, and $NiSO_4.ZnSO_4.(NH_4)_2SO_4$. The relative quantities of each compound in the precipitate depend on the pH value obtained during the pH adjustment step. The compound $NiSO_4.(NH_4)_2SO_4$ has been observed to precipitate in greater quantities at a slightly higher pH than the pH at which $ZnSO_4.(NH_4)_2SO_4$ and $NiSO_4.ZnSO_4.(NH_4)_2SO_4$ precipitate. Therefore, as the pH approaches pH 7.5, the relative quantity of zinc in the precipitate increases.

The precipitate can be separated from the solution by various means known in the art including centrifugation, decanting and filtration. The precipitate can then be washed with water or an ammonium sulfate solution (to prevent dissolution of precipitate crystals) to remove adhering copper ions. The amount of wash solution will depend on the desired purity, however 0.5 l of 100 g/l ammonium sulfate solution per kilogram (kg) of precipitate is acceptable.

The products resulting from precipitation are a purified cupric tetrammine sulfate solution, preferably containing less than 2 g/l total of nickel and zinc contaminants, and the ammonium sulfate salts of nickel and zinc, with minor amounts of copper. The exact quantities of copper, nickel and zinc in the precipitate will depend on the original concentrations of each metal in the spent electrolyte prior to precipitation.

The cupric tetrammine sulfate solution can be recycled as a lixiviant to solubilize copper in additional copper-containing materials in the leaching zone.

The zinc and nickel concentration in the cuprous ammine sulfate leachate/electrolyte can be effectively controlled by treating a bleed stream of the spent electrolyte in accordance with this invention prior to the recycling of the solution to the leaching zone. Depending on the nickel and zinc content of the copper-containing material, it may not be necessary for the entire stream of spent electrolyte to undergo the subject method prior to recycling to the leaching zone. However, cuprous ammine sulfate in the spent electrolyte must be oxidized to cupric tetrammine sulfate to be an effective lixiviant of copper in copper-containing materials.

The precipitate can be used to generate aqueous zinc and nickel ammine sulfate by either contacting the precipitate with aqueous calcium hydroxide to produce a $CaSO_4$ or gypsum precipitate, which can be removed by filtration or centrifugation, or by the addition of aqueous ammonia. The nickel and zinc ammine sulfate solution can then be used to generate nickel and zinc.

The nickel and zinc ammine sulfate solution can be subjected to zinc cementation. This method involves the addition of zinc to the solution to displace nickel in solution and cause the precipitation of a crude nickel. The nickel precipitate can be further purified by methods known in the art, for example, Inco's nickel carbonyl process. The resulting zinc ammine sulfate solution can then be subjected to electrolysis to recover zinc. The zinc ammine sulfate solution can also be used to make up ammonium sulfate in the cupric tetrammine sulfate lixiviant.

Alternately, the nickel and zinc ammine sulfate solution can be subjected to solvent extraction, (e.g. using Lix 64 available from Henkel Corp.) for the removal of nickel in the organic phase. The nickel is then stripped from the solvent in an acid solution, e.g., sulfuric acid, and can be subjected to electrowinning. The remaining zinc in solution can be recovered by electrowinning. Alternately, the zinc ammine sulfate solution may be used to make up ammonium sulfate in the cupric tetrammine sulfate lixiviant.

Figure 1B:
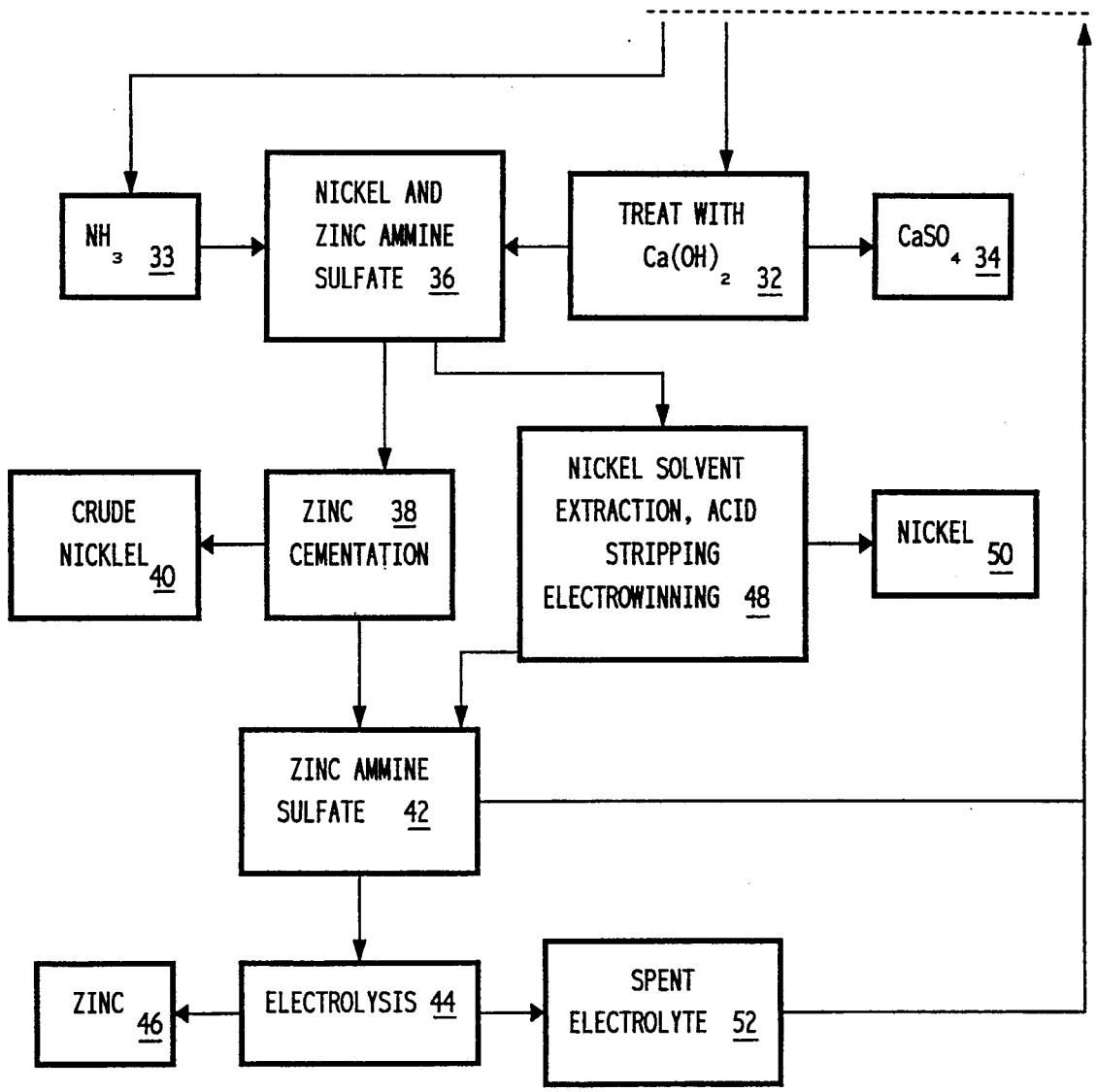

Referring now to FIG. 1, copper-containing materials 4 are added to a digestor 6 which can be a vessel or vat with a means for agitation or mixing. Cupric tetrammine sulfate solution 2 is added to the digestor 6 and selectively solubilizes only a few metals, including copper, zinc and nickel. It has been observed that the cupric tetrammine sulfate solution does not attack steel provided that the free ammonia in solution is sufficient to produce a pH above pH 9.5. The digestor 6 can therefore be made of steel.

The cupric tetrammine sulfate solution 2 preferably contains little or no nickel and zinc contamination. It is preferred that the cupric tetrammine sulfate solution 2 contain less than a total of 2 g/l of nickel and zinc. The concentrations of nickel and zinc in the cupric tetrammine sulfate solution 2 in combination with the the nickel and zinc leached from the copper-containing material 4 determine the zinc and nickel concentrations in the copper ammine sulfate leachate 12. As discussed hereinabove, a copper plate having a 99.99% by weight purity can be produced from a copper ammine sulfate solution 12 having less than 10 g/l nickel and less than 25 g/l zinc contamination.

After the addition of cupric tetrammine sulfate solution 2 and copper-containing material 4 to the digestor 6, ammonium sulfate 10 can be added if necessary to bring the ammonium sulfate concentration to at least about 100 g/l, and preferably to the range of about 200 g/l to about 300 g/l. Ammonia 8 can be added to raise the free ammonia concentration to at least about 40 g/l and the pH to at least pH 8.5, and preferably to at least pH 9.0. Copper-containing material 4 can be added to raise the copper concentration for purposes of maximizing yield. The cupric ion of cupric tetrammine sulfate oxidizes metallic copper, nickel and zinc in the ores, scrap and/or dust to produce a cuprous ammine sulfate leachate 12 containing some nickel and zinc contamination. As discussed hereinabove, it is preferred that the nickel and zinc contamination remain below about 10 g/l and 25 g/l, respectively.

Following removal of the substantially decoppered scrap 14, the cuprous ammine sulfate 12 containing zinc and nickel is subjected to electrolysis 16 for the recovery of copper 18. The duration of the electrolysis 16 is determined by the desired quantity of copper 18 to be recovered. Typically, the quantity of copper 18 recovered is an amount that results in about a 20 g/l to 30 g/l decrease in the copper concentration in the electrolyte 20. It is preferable that at least 10 g/l copper remain in the electrolyte 20 if recycling of the spent electrolyte 20 to the digestor 6 for further extraction of copper is desired.

The spent electrolyte 20 comprises cuprous and cupric ammine sulfate having solubilized nickel and zinc contaminants. The spent electrolyte is oxidized 22 to convert cuprous ion to cupric ion. The oxidant is preferably air sparged into the copper, zinc and nickel ammine sulfate-containing spent electrolyte 20. The resulting cupric ion-containing solution 23 may optionally be cooled to between about 20° C. and about 30° C. and its pH is lowered to between about pH 7.5 and about pH 8.0 24, resulting in the precipitation of ammonium sulfate salts of zinc and nickel 26. The precipitate 26 can be separated by a suitable liquid/solids separation method, such as centrifugation or filtration. The filtrate, cupric tetrammine sulfate solution 28 can be recycled to the digestor 6 for leaching additional copper, nickel and zinc from copper-containing materials 4.

The nickel and zinc ammonium sulfate salt precipitate 26 can be washed 30, e.g., with water or an aqueous ammonium sulfate solution. The ammonium sulfate salts can then be reconstituted to aqueous nickel and zinc ammine sulfate 36 by either contacting the precipitate with aqueous calcium hydroxide 32 to produce a precipitate, $CaSO_4$ or gypsum 34, which can be removed by filtration or centrifugation, or by addition of aqueous ammonia 33. The nickel and zinc ammine sulfate solution 36 can then undergo alternate methods of nickel and zinc recovery. For example, the nickel and zinc ammine sulfate solution 36 can be purified of substantially all of its nickel by zinc cementation 38. Zinc cementation involves the addition of zinc to the nickel and zinc ammine sulfate solution to displace the nickel and cause the precipitation of a crude nickel 40 which can then be further purified by methods known in the art. The filtrate, a zinc ammine sulfate solution 42 can be purified of trace amounts of copper by known methods, e.g. cementation of copper with zinc, prior to electrolysis 44 to produce purified zinc 46. The zinc ammine sulfate solution 42 or the spent electrolyte 52 resulting from zinc electrolysis 44 can be recycled to the digestor 6 to make up ammonium sulfate.

Alternately, the nickel and zinc ammine sulfate solution 36 can be subjected to a solvent extraction specific for nickel resulting in a nickel-loaded organic phase, which can then be stripped of the nickel by an acid (e.g., sulfuric acid) to produce an aqueous nickel-containing solution suitable for the electrolytic recovery 48 of nickel 50. The spent electrolyte, zinc ammine sulfate 42, can then be recycled to the digestor 6. Alternately, zinc 46 can be recovered from the zinc ammine sulfate 42 by electrolysis 44. The spent electrolyte 52, zinc ammine sulfate, can also be recycled to make up ammonium sulfate 10 in the digestor 6.

The following examples are for illustration of the present invention and are not intended to limit the scope of invention.

EXAMPLE 1

To 200 milliliters (ml) of a solution containing 200 g/l ammonium sulfate, 50 g/l cupric ion, 13 g/l zinc and 75 g/l free ammonia, and having a pH of pH 8.8, 17.8 ml of an aqueous solution of 60% by weight $H_2SO_4$ was added. The temperature was 24° C. 12.4 g of precipitate were recovered by filtration. The residual solution assayed 1.7 g/l zinc; the precipitate assayed 17% zinc. Zinc recovery in the precipitate was 84% with only a 2% loss of the copper from the solution to the precipitate.

EXAMPLE 2

Three 200 ml solutions each containing 10 g/l cupric ion, 13 g/l zinc and 35 g/l free ammonia, and varying amounts of ammonium sulfate as indicated in Table 2.1 below, at about 20° C. were acidified with 12.8 ml of an aqueous solutuion of 60% by weight sulfuric acid to pH 8.3. The precipitates were recovered by filtration. The amounts of zinc and copper recovery are indicated in Table 2.1 below:

TABLE 2.1

| Ammonium Sulfate (g/l) | Precipitate (g) | Cu (%) | Zn (%) | Zn (g) |
| --- | --- | --- | --- | --- |
| 300 | 7.7 | 0.21 | 23.5 | 1.8 |
| 200 | 7.0 | 0.25 | 22.0 | 1.5 |
| 100 | 4.6 | 0.25 | 21.5 | 1.0 |

This example illustrates that increasing ammonium sulfate concentration in the lixiviant results in an increased recovery of zinc from, and decreased loss of coppper to, the precipitate.

EXAMPLE 3

To 200 ml of a solution containing 300 g/l ammonium sulfate, 50 g/l cupric ion, 13 g/l zinc and 75 g/l free ammonia, was added 33 ml of 60% sulfuric acid to lower the pH to pH 7.6. After cooling to 23° C., the precipitate was removed by filtration. The precipitate was 18.5% zinc and represented 88% of the zinc in solution. The filtrate assayed 1.3 g/l zinc. Only 0.27% of the precipitate was copper; this represented 3.4% of the original copper in solution.

EXAMPLE 4

To 200 ml of a solution containing 250 g/l ammonium sulfate, 50 g/l cupric ion, 13.5 g/l zinc and 75 g/l ammonia, 27 ml of 60% sulfuric acid was added. After cooling the pH was pH 7.3. The precipitate was collected and analyzed 8.2% zinc and 29% copper.

This Example illustrates that lowering the pH to below pH 7.5 results in a precipitate having substantial (29%) copper contamination and a relatively low (8.2%) zinc recovery.

EXAMPLE 5

To 200 ml of a solution containing 300 g/l ammonium sulfate, 75 g/l free ammonia, 13 g/l zinc, and 85 g/l copper of which 70 g/l was cuprous ion and 15 g/l cupric ion, and having a pH of pH 10, 9.1 ml of 60% sulfuric acid was added. The precipitate was recovered and found to be 76% copper and 0.2% zinc.

This Example, when compared to Example 3, illustrates the necessity of maintaining low cuprous ion concentration in the leachate during the precipitation step. The high (70 g/l) concentration of cuprous ion resulted in heavy (76%) copper contamination of the precipitate.

EXAMPLE 6

To 200 ml of a solution containing 200 g/l ammonium sulfate, 10 g/l nickel, 60 g/l copper and 60 g/l free ammonia, a volume of concentrated (97%) sulfuric acid sufficient to lower the pH to pH 7.6 was added. The precipitate removed from the solution by filtration and found to have a ratio of nickel to copper of 11 to 1. The pH was further lowered to pH 7.45 and a second precipitate formed which was found to have a ratio of nickel to copper of 1 to 6.

This Example illustrates that if the pH of the leachate is lowered to below pH 7.5, nickel recovery decreases and copper contamination increases.

EXAMPLE 7

To a solution containing 60 g/l cupric ion, 10 g/l nickel, 200 g/l ammonium sulfate, 25 g/l zinc and 30 g/l free ammonia having a pH of pH 8.5, a volume concentrated (97%) sulfuric acid sufficient to lower the pH to pH 8.0 was added. The precipitate was 8.6% nickel, 5.4% zinc and 1.0% copper.

Additional concentrated sulfuric acid was added to lower the pH to pH 7.7. The resulting precipitate was 5% nickel, 9.3% zinc and 0.8% copper.

Sulfuric acid was again added to reduce the pH to below pH 7.5. The resulting precipitate was 11.9% copper, 3.3% zinc and 0.4% nickel.

This Example illustrates that in the precipitation of ammonium sulfate salts of nickel and zinc, the pH is critical to the effective separation of copper from nickel and zinc.

While present embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for separating materials selected from the group consisting of zinc-containing materials, nickel-containing materials and mixtures thereof, from an aqueous copper ammine sulfate solution, comprising the steps of:
   (a) providing an aqueous copper ammine sulfate solution comprising cuprous ions, ammine ions, and sulfate ions and materials selected from the group consisting of zinc-containing materials, nickel-containing materials and mixtures thereof, ammonium sulfate, and free ammonia;
   (b) oxidizing said cuprous ions in said copper ammine sulfate solution to cupric ions to form a first cupric ion-containing solution; and
   (c) adjusting the pH of said cupric ion-containing solution to within the range from about pH 7.5 to about pH 8.0 to form a precipitate comprising zinc-containing materials, nickel-containing materials, and mixtures thereof, and to form a second cupric ion-containing solution relatively free of nickel and zinc.

2. The method of claim 1, wherein the concentration of said ammonium sulfate in said copper ammine sulfate solution is at least 100 g/l.

3. The method of claim 1, wherein the concentration of said ammonium sulfate in said copper ammine sulfate solution is from about 250 g/l to about 300 g/l.

4. The method of claim 1, wherein the concentration of said free ammonia in said copper ammine sulfate solution is sufficient to produce a pH of at least about pH 8.5.

5. The method of claim 1, wherein the concentration of said free ammonia in said copper ammine sulfate solution is sufficient to produce a pH of at least about pH 9.0.

6. The method of claim 1, wherein the step of adjusting the pH comprises adding sulfuric acid.

7. The method of claim 1, wherein the step of adjusting the pH comprises adding an aqueous solution of 60% by weight sulfuric acid.

8. The method of claim 1, wherein said oxidizing step comprises bubbling an oxygen-containing gas through said solution.

9. The method of claim 1, wherein the total concentration of said zinc and nickel remaining in the solution following said precipitation step is less about 2 g/l.

10. The method as set forth in claim 1, wherein said zinc and nickel containing precipitate comprises about 0.1% by weight copper.

11. The method as set forth in claim 1, wherein said second cupric ion-containing solution comprises less than about 2.0 g/l of zinc and nickel contaminants.

12. The method as set forth in claim 1, wherein said first cupric ion-containing solution comprises at least about 5 g/l of zinc.

* * * * *